United States Patent
Arques et al.

(10) Patent No.: US 8,030,607 B2
(45) Date of Patent: Oct. 4, 2011

(54) MATRIX OF PIXELS PROVIDED WITH VOLTAGE REGULATORS

(75) Inventors: Marc Arques, Grenoble (FR); Jean-Luc Martin, Saint Geoirs en Valdaine (FR); Arnaud Peizerat, Grenoble (FR)

(73) Assignee: Commissariat a l'Energie Atomique, Paris (FR)

( * ) Notice: Subject to any disclaimer, the term of this patent is extended or adjusted under 35 U.S.C. 154(b) by 308 days.

(21) Appl. No.: 12/237,493

(22) Filed: Sep. 25, 2008

(65) Prior Publication Data

US 2009/0085402 A1  Apr. 2, 2009

(30) Foreign Application Priority Data

Sep. 27, 2007  (FR) .................................. 07 57900

(51) Int. Cl.
*G01T 1/24* (2006.01)
*H01L 27/00* (2006.01)
*H02J 1/00* (2006.01)
(52) U.S. Cl. .................. 250/208.1; 250/370.09; 307/31
(58) Field of Classification Search ............... 250/208.1, 250/370.09; 307/31; 326/33
See application file for complete search history.

(56) References Cited

U.S. PATENT DOCUMENTS

| | | | |
|---|---|---|---|
| 4,163,161 A | | 7/1979 | Walker |
| 6,130,423 A * | | 10/2000 | Brehmer et al. ........... 250/208.1 |
| 6,151,251 A * | | 11/2000 | Campardo et al. ....... 365/185.24 |
| 6,704,050 B1 * | | 3/2004 | Washkurak et al. .......... 348/294 |
| 6,707,497 B1 * | | 3/2004 | Pantigny et al. .............. 348/310 |
| 7,157,682 B2 * | | 1/2007 | Brehmer et al. ........... 250/208.1 |
| 7,615,755 B2 * | | 11/2009 | Coello et al. ............. 250/370.09 |
| 7,732,748 B2 * | | 6/2010 | Johansson ................. 250/214 R |
| 2002/0011554 A1 * | | 1/2002 | Brehmer et al. ........... 250/208.1 |
| 2002/0030152 A1 * | | 3/2002 | Afghahi ..................... 250/208.1 |
| 2003/0080279 A1 * | | 5/2003 | Afghahi ..................... 250/208.1 |
| 2003/0146389 A1 | | 8/2003 | Busse et al. |
| 2004/0178349 A1 | | 9/2004 | Kameshima |
| 2005/0218333 A1 * | | 10/2005 | Kameshima ............. 250/370.11 |
| 2006/0113484 A1 * | | 6/2006 | Endo ........................ 250/370.11 |
| 2007/0205802 A1 | | 9/2007 | Perisetty |
| 2008/0191139 A1 * | | 8/2008 | Coello et al. ............. 250/370.09 |
| 2009/0085141 A1 * | | 4/2009 | Peizerat et al. ............... 257/443 |

(Continued)

FOREIGN PATENT DOCUMENTS

EP  0 952 615 A1  10/1999

OTHER PUBLICATIONS

French Search Report dated Jan. 25, 2008.
Aldokhaiel et al; "A Sub-1 Volt CMOS Bandgap Voltage Reference Based on Body-Driven Technique", Regular Session A: Analog Techniques, IEEE 0-7803-8322-2/04 (2004) pp. 5-8.

*Primary Examiner* — John Lee
(74) *Attorney, Agent, or Firm* — Pearne & Gordon LLP

(57) ABSTRACT

A matrix microelectronic device comprising: a plurality of cells arranged according to a matrix, one or several conductive lines provided to carry a given potential and to which respectively one or several cells of a row of cells of the matrix are linked, a plurality of voltage regulating elements, wherein said regulating elements are connected respectively between a cell of said plurality of cells and one of said conductive lines, said given potential serving as polarisation potential of said regulating elements, wherein said regulating elements are respectively provided to apply to said given cell a regulated polarisation potential.

12 Claims, 5 Drawing Sheets

U.S. PATENT DOCUMENTS

2009/0085402 A1* 4/2009 Arques et al. .................. 307/31
2009/0207290 A1* 8/2009 Kondo et al. ................. 348/302
2010/0108898 A1* 5/2010 Zhang et al. ............. 250/370.09
2010/0108899 A1* 5/2010 Kobayashi et al. ...... 250/370.09
2010/0155613 A1* 6/2010 Jung ........................ 250/370.09
2010/0194957 A1* 8/2010 Yu ................................. 348/308

* cited by examiner

MATRIX OF PIXELS PROVIDED WITH VOLTAGE REGULATORS

TECHNICAL FIELD

The invention relates to the field of microelectronic devices formed of elementary cells arranged in a matrix and comprising at least one plurality of cells connected to one or several conductive polarisation lines provided to carry a given potential. The invention applies in particular to matrices of large sized cells, such as matrices of sensors of electromagnetic radiation, for example of X-rays, in particular produced in CMOS technology.

The invention enables the implementation of matrix microelectronic devices formed of elementary cells of large dimensions, comprising means for offsetting the phenomena of variations of potential along lines intended to apply a given potential, for example a supply or reference potential, to a plurality of cells of the matrix.

PRIOR ART

Electromagnetic radiation detector microelectronic devices in the form of matrices of pixels, when they integrate within the pixels a device for processing, for example, at least one amplification element, or a counting, or digitization circuit, generally have a considerable consumption, and have ohmic drops, along the lines or columns of the matrix, which are greater the farther the distance from the supply points to which the lines or columns of the matrix are connected.

FIG. 1 illustrates a phenomenon of ohmic drop for a 3×3 matrix of pixels noted $10_1, \ldots, 10_9$ connected to a supply line 2 carrying a potential Vdd for example equal to 1.2 volts or 3.3 volts and an ground line 4 carrying a potential Vss for example of around 0 Volt, through the intermediary respectively of a first plurality of conductive lines $5_1, 5_2, 5_3$, and a second plurality of conductive lines $7_1, 7_2, 7_3$.

In practice, the matrices of an electromagnetic radiation sensor or detector are generally much larger than those represented in FIG. 1. For example, if a matrix of 2000×2000 pixels with each pixel consuming 10 μW, which may correspond for example to a current of 3 μA under 3.3 volts is considered, an overall consumption of the matrix of around 40 Watts may be attained.

With pixels of dimensions 100 μm×100 μm, which would correspond to a matrix of 20 cm×20 cm, such a power of 40 W transferred to such a matrix area would be relatively acceptable. However, the problem is posed of the supply of the pixels of such a matrix. If the respective supply of the pixels is distributed by buses in line or in column, the supply line for example at the potential Vdd and the ground line at a potential Vss have to serve 2000 pixels.

If for example these buses or these conductive lines are produced in the form of aluminium tracks around 20 μm wide, and having a resistance per square of around 30 mOhms, buses of resistance of around 300 Ohms are then obtained. The total current to carry by these buses is around 2000×3 μA. This current decreases linearly with the progression along the conductive lines $5_1, 5_2, 5_3$.

The voltage drop at the end of the line may then be around 0.9 V, so that the localised supply potentials Vdd_11, Vdd_12, Vdd_13, ..., Vdd_31, Vdd_32, Vdd_33, applied to the pixels and ground potentials Vss_11, Vss_12, Vss_13, ..., Vss_31, Vss_32, Vss_33 can vary in a significant manner from one pixel to another. Consider for example an overall supply between an ground potential Vss of 0 volt and a supply potential Vdd of 3.3 volts: a pixel at the matrix edge or extremity is supplied between 0 V and 3.3 V, whereas a pixel at the end of the matrix is likely to be supplied between (0V+0.9V) and (3.3V−0.9V), i.e. between 0.9 and 2.4V. The operation of the pixels of such a matrix is therefore likely to vary considerably as a function of their position in the matrix.

Document US 2004/0178349 A1 discloses a matrix device equipped with a voltage regulating element. In this device, since the regulating element is placed upstream of the conductive polarisation lines, the ohmic drop phenomenon is not resolved.

The problem is posed of finding a novel microelectronic device formed of a matrix of pixels, which does not have the above mentioned drawbacks.

DESCRIPTION OF THE INVENTION

The invention concerns a matrix microelectronic device comprising:
- a plurality of cells arranged according to a matrix,
- one or several conductive lines provided to carry a given potential and to which respectively one or several cells of a row of cells of the matrix are linked,
- a plurality of voltage regulating elements, wherein said regulating elements are connected respectively between a cell of said plurality of cells and one of said conductive lines, said given potential serving as polarisation potential of said regulating elements, wherein said regulating elements are respectively provided to apply to said given cell a regulated polarisation potential.

According to one possibility, said conductive lines may comprise one or several conductive supply lines each provided to carry a supply potential. In this case, the device may comprise among said plurality of voltage regulating elements, one or several supply potential regulating elements.

Said supply potential regulating elements may be connected respectively between a cell of said plurality of cells and one of said conductive supply lines, polarised by means of the supply potential, and respectively provided to apply to said cell a regulated supply potential.

According to another possibility, said conductive lines may comprise one or several conductive lines provided to be placed at a reference or ground potential, the device comprising among said plurality of voltage regulating elements one or several ground potential regulating elements, wherein said ground potential regulating elements are polarised by means of the ground potential and respectively provided to apply to said cell a regulated ground potential.

According to a first possibility, the regulating elements may comprise respectively at least one regulation transistor, provided to be arranged and polarised in such a way as to operate in saturation regime.

The regulating elements may comprise respectively at least one regulation transistor having a gate placed at another polarisation potential, the device further comprising:
means to apply said other polarisation potential to the gate of a plurality of regulation transistors.

According to a second possibility, the regulating elements may comprise respectively:
means forming a differential amplifier in which one input is placed at the regulated polarisation potential, and in which the output is connected to the gate of the regulation transistor.

The differential amplifier may comprise an input placed at another polarisation potential, the device further comprising:
means to apply said other polarisation potential to the input of a plurality of differential amplifiers.

The regulation transistor may comprise a source electrode at the regulated polarisation potential and a substrate electrode connected to said source electrode.

According to one embodiment possibility, the elementary cells may comprise respectively:
at least one electromagnetic radiation detector,
one or several electronic components.

The detector may be an X-ray detector.

According to another embodiment, the elementary cells may be connected respectively to:
at least one electromagnetic radiation detector, situated on a substrate different to that on which are placed the cells.

BRIEF DESCRIPTION OF DRAWINGS

The present invention will be better understood on reading the description of embodiments given solely by way of indication and in no way limiting and by referring to the appended figures in which.

Identical, similar or equivalent parts of the different figures bear the same number references so as to make it easier to go from one figure to the next.

In order to make the figures more legible, the different parts represented in the figures are not necessarily to a uniform scale.

DETAILED DESCRIPTION OF SPECIFIC EMBODIMENTS

Figure 1:
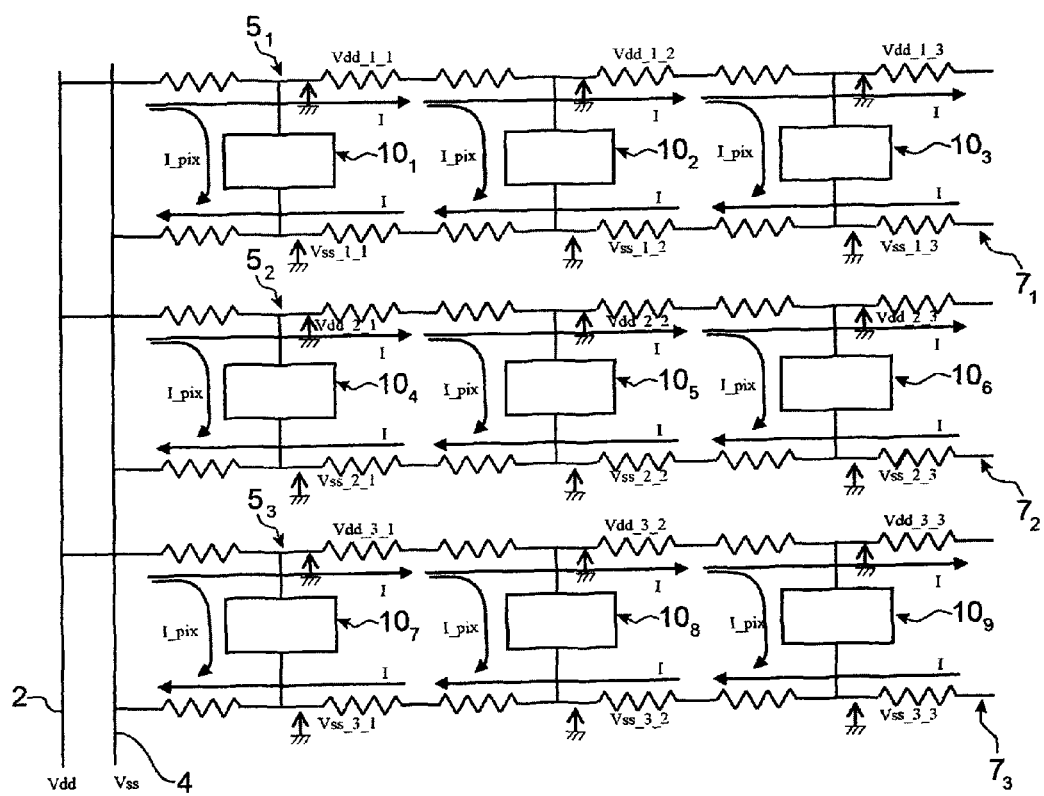
FIG. 1 illustrates a matrix microelectronic device according to the prior art.
Figure 2:
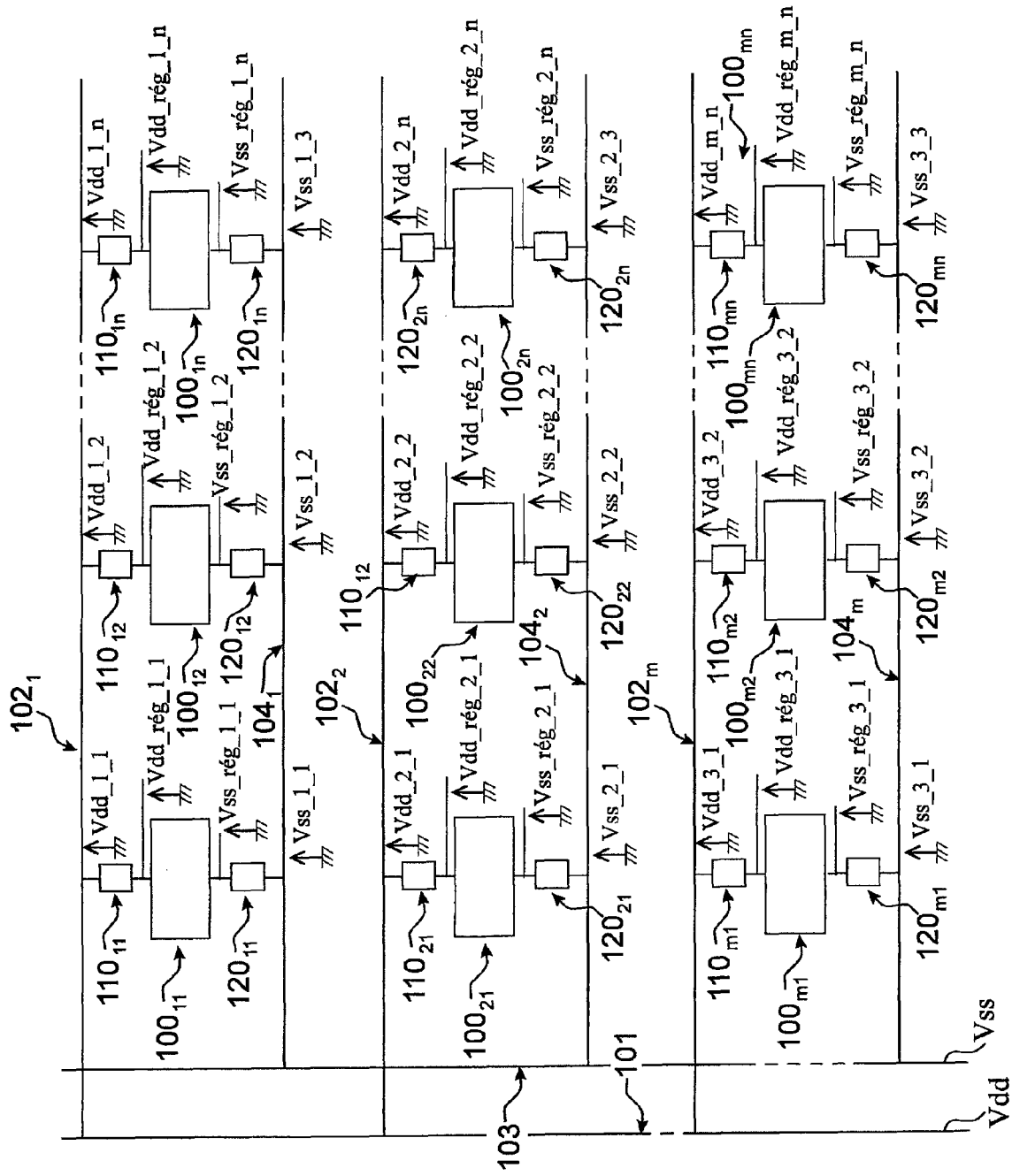
FIG. 2 illustrates a matrix microelectronic device according to the invention and formed of a plurality of elementary cells.

An example of microelectronic device according to the invention will now be given in relation to FIG. 2.

This microelectronic device comprises a matrix of n*m elementary cells $100_{11}$, $100_{12}$, $100_{13}$, . . . , $100_{21}$, $100_{22}$, $100_{23}$ . . . , $100_{33}$, . . . , $100_{ij}$, $100_{mn}$, with n which may be equal to m and for example equal to 2000.

The elementary cells, may be for example electromagnetic radiation sensor pixels and may comprise respectively at least one electromagnetic radiation detector element, for example an X-ray detector, as well as an electronic circuit, for example an electronic circuit for processing and/or amplifying the output signal of the detector.

The matrix of elementary cells may have a size for example of around ten or so square centimetres or several hundreds of square centimetres, for example a dimension of around 10 cm×10 cm or 20 cm×20 cm. In the case of a matrix of X-ray detectors, the elementary cells may comprise a photodetector sensitive to visible light in each pixel, photodiode, photoMOS, pinched diode for example, and coupled to scintillating layers, CsI, or Gd2O2S for example, enabling the detection of X-ray photons and to transform them into visible photons. Components, for example produced in CMOS technology, assure the detection by transforming the visible photons into electric charges.

The device further comprises a supply line 101 also know as supply bus provided to deliver a first potential Vdd, for example of around 3.3 volts, as well as another line 103 serving as ground line also known as ground bus and which is capable of being placed at a second potential Vss, for example of around 0 volt.

The device may further comprise a first plurality of conductive lines $102_1$, $102_2$, . . . , $102_m$, connected to the supply line 101 and a second plurality of conductive lines $104_1$, $104_2$, . . . , $104_m$, connected to the ground line 103.

The pixels $100_{11}$, $100_{12}$, $100_{13}$ of a same row, are electrically linked to the supply line 101, by the intermediary of a same conductive line $102_1$ of the first plurality of conductive lines $102_1$, $102_2$, . . . , $102_m$, and to the ground line 103 by the intermediary of a same conductive line $104_1$ of the second plurality of conductive lines $104_1$, $104_2$, . . . , $104_m$.

The device comprises voltage regulating means, for example in the form of a first plurality of m*n regulating elements $110_{11}$, $110_{12}$, . . . , $110_{1n}$, $110_{21}$, $110_{22}$, . . . , $110_{2n}$, $110_{m1}$, $110_{m2}$, . . . , $110_{mn}$ and a second plurality of m*n regulators $120_{11}$, $120_{12}$, . . . , $120_{1n}$, $120_{21}$, $120_{22}$, . . . , $120_{2n}$, $120_{m1}$, $120_{m2}$, . . . , $120_{mn}$.

In this example, the pixels of the matrix are each associated with a first voltage regulating element of the first plurality of regulating elements situated between the pixel and the conductive line of the first plurality of conductive lines. The pixels of the matrix can also each be associated with a second voltage regulating element of the second plurality of regulating elements, situated between the pixel and the conductive line of the second plurality of conductive lines.

The first regulating element $110_{1n}$ of a pixel $100_{1n}$ receives a potential Vdd_1_n of a conductive line $102_1$ of the first plurality of conductive lines $102_1$, $102_2$, . . . , $102_m$, which may have undergone a variation, in particular a reduction, compared to the potential Vdd at which is placed the supply line 101. The first regulating element $110_n$ is polarised by means of the potential Vdd_1_n delivered by the conductive line $102_1$ connected to the supply line 101, and provided to apply to the pixel $110_{1n}$ to which it is associated, a regulated supply potential Vdd_reg_1_n.

The second regulating element $120_{1n}$ of a pixel $100_{1n}$ is connected to a potential Vss_1_n of a conductive line $104_1$ of the second plurality of conductive lines $104_1$, $104_2$, . . . , $104_m$, which may have undergone a variation compared to the potential Vss at which is placed the ground line 103. The second regulating element $120_{1n}$ is polarised by means of the potential Vss_1_n delivered by the conductive line $104_1$ connected to the ground line 103, and provided to apply to the pixel to which it is associated, a regulated ground potential Vss_reg_1_n.

The regulated supply potentials Vdd_reg_1_1, Vdd_reg_1_2, Vdd_reg_1_3, . . . , Vdd_reg_1_n, Vdd_reg_2_1, Vdd_reg_2_2, . . . , Vdd_reg_2_n, applied respectively to the pixels $100_{11}$, $100_{12}$, $100_{13}$, . . . , $100_{21}$, $100_{22}$, $100_{23}$ . . . , $100_{33}$, . . . $100_{nm}$ are equal or substantially equal to each other or different to each other by less than several tens of mV.

Along a row of the matrix, the regulated supply potentials Vdd_reg_1_1, Vdd_reg_1_2, . . . , Vdd_reg_1_n, respectively applied to the pixels $100_{11}$, $100_{12}$, $100_{1n}$ of this row, vary little compared to the potentials Vdd_1_1, . . . , Vdd_1_n, along the conductive line $102_1$, of the first plurality of conductive lines.

Around a tenfold improvement may be obtained.

The regulated ground potentials Vss_reg_1_1, Vss_reg_1_2, Vss_reg_1_2, . . . , Vss_reg_1_n, Vss_reg_2_1

Vss_reg_2_2, . . . , Vss_reg_2_n are substantially equal to each other or different to each other by less than several tens of mV.

In the same way, along a row of the matrix, the regulated supply potentials Vdd_reg_1_1, Vdd_reg_1_2, . . . , Vdd_reg_1_n, applied respectively to the pixels $100_{11}$, $100_{12}$, $100_{1n}$ of this row, vary little compared to the potentials Vdd_1_1, . . . , Vdd_1_n, along the conductive line $102_1$, of the first plurality of conductive lines. Around a tenfold improvement may be obtained.

The present invention is not restricted either to the implementation of 2 voltage regulators per pixel and may concern the implementation of other regulators at the level of the pixels in order to regulate one or several other auxiliary voltage(s) carried by a conductive line to a row of pixels of the matrix, and which the pixels need in order to function.

According to an alternative embodiment, a device equipped with a single voltage regulator per pixel to deliver a regulated supply potential may be provided for. According to another alternative embodiment, a single voltage regulator per pixel to deliver a regulated ground potential, may be provided for.

Figure 3:
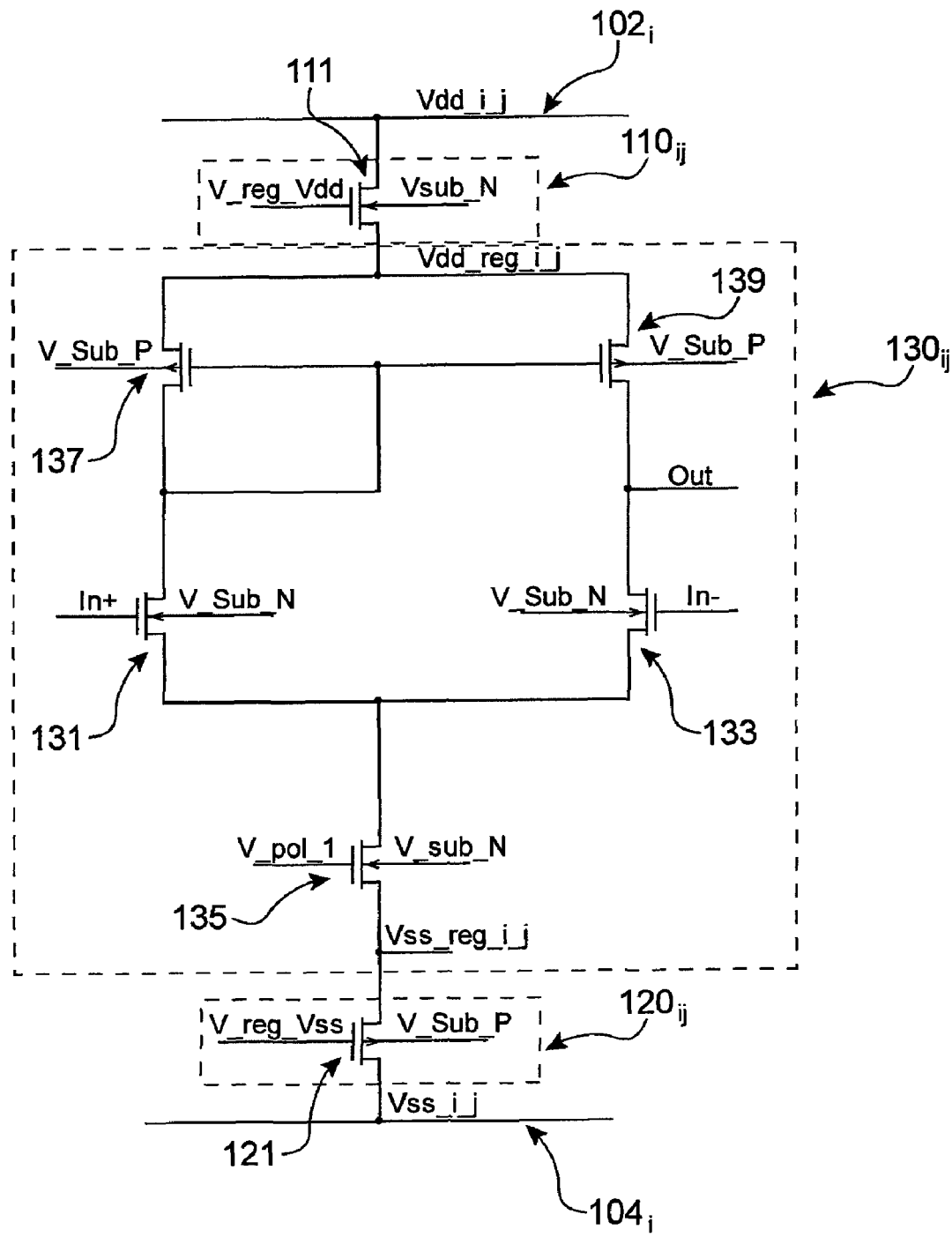
FIG. 3 illustrates an elementary cell of a matrix microelectronic device, associated with a first example of voltage regulation means implemented according to the invention.

An example of elementary cell integrated in a microelectronic device according to the invention is illustrated in FIG. 3.

In this figure, a differential amplifier 130 integrated to a pixel $100_{ij}$ of a matrix such as that described previously in relation to FIG. 2, are represented. The differential amplifier 130 may be formed of a plurality of transistors, for example of 5 transistors 131, 133, 135, 137, 139. A first transistor 131, for example of NMOS type, and a second transistor 133, for example of NMOS type, form a differential pair, and have a common electrode source.

The first transistor 131 situated at the input of the differential amplifier 130 may be linked for example to a detector element and may receive for example an analogue signal Vint on its gate, which forms a non-inverting input In+ of the differential amplifier, and the gate of the second transistor 133 is capable for its part of forming the non-inverting input In− of the differential amplifier and may be placed for example at a reference potential or at the out output potential of the amplifier 120, in such a way as to produce a follower amplifier function.

The source electrode common to the first transistor NMOS 131 and the second NMOS transistor 133 is also linked to the drain of a third NMOS transistor 135, which plays the role of a current source and in which the gate is for its part placed at a fixed potential Vpol1.

The differential amplifier 130 further comprises a fourth transistor 137, for example of PMOS type and a fifth transistor 139, for example of PMOS type. The fourth transistor 137 and the fifth transistor 139 are arranged or assembled in current mirror. The fourth transistor 137 and the fifth transistor 139 also share a common source region, placed at a regulated potential Vdd_reg_ij. The drain electrodes of the fourth transistor 137 and the fifth transistor 139 are for their part respectively linked to the drain electrode of the first transistor 131 and to the drain electrode of the second transistor 133. The fourth transistor 137 also has a gate electrode and a drain electrode linked together.

The output of the differential amplifier 130 may be taken at the level of the drain electrode of the fifth transistor 139 and the drain electrode of the second transistor 133, and may be connected for example to a processing circuit or to the output of the pixel when the pixel is selected to be read.

The transistors 131 and 133 forming the differential pair and the transistor 135 forming the current source may be of the same type, for example of N type, and be connected to a same substrate electrode placed at the substrate potential V_sub_N, whereas the transistors forming the current mirror may be of the same type, for example of P type, and be connected to a substrate electrode at the substrate potential V_sub_P.

In this example of device, the first voltage regulating element $110_{ij}$ is formed of a regulator transistor 111, for example an N type MOS transistor, placed between a conductive line $102_i$ of the first plurality of conductive lines and between the pixel $100_{ij}$. The transistor 111 is provided to be in a saturation functioning mode, wherein its gate is polarised at a potential V_reg_Vdd.

The polarisation potential V_reg_Vdd may be applied to several regulator transistors similar to the transistor 111 and provided, like the transistor 111, to regulate the supply potential respectively of a pixel of the matrix. The polarisation potential V_reg_Vdd may be applied, for example by means of a conductive line or a network or grid of conductive lines known as a "gate" to several regulator transistors of the type of transistor 111.

The first transistor 111 has its drain connected to a conductive line $102_i$ of the first plurality of lines, and which is at a potential Vdd_i_j which may have undergone a variation, in particular a reduction, compared to the supply potential Vdd at which is placed the supply line 101. The potential Vdd_i_j serves as polarisation potential to the transistor 111 which delivers at its source the regulated supply potential Vdd_reg_i_j, for example of around 2.2 volts applied to the pixel $100_{ij}$, in the case where Vdd=3.3 volts and that the maximum ohmic drop is around 0.9 V. The maximum local voltage Vdd_i_j is then around 3.3−0.9=2.4 V. The regulator transistor 111 can regulate to a voltage less than 2.4 V with a margin of around 100 mV.

In this example of device, the second voltage regulating element $120_{ij}$ is formed of a transistor 121, for example a P type MOS transistor, placed between a conductive line $104_i$ of the second plurality of conductive lines and between the pixel $100_{ij}$. The transistor 121 is provided to be in a saturation functioning mode, wherein its gate is polarised at a potential V_reg_Vss provided for this purpose.

The polarisation potential V_reg_Vss may be applied to several regulator transistors similar to the transistor 121 and provide, like the transistor 121, to regulate the ground potential respectively of a pixel of the matrix. The polarisation potential V_reg_Vss may be applied, for example by means of a conductive line or a conductive network (not represented) to several regulator transistors such as the transistor 121. The transistor 121 has an electrode connected to a conductive line $104_i$ of the second plurality of conductive lines, and which is at a potential Vss_i_j which may have undergone a variation, compared to the ground potential Vss at which is placed the ground line 103. The potential Vss_i_j serves as polarisation potential to the transistor 121 which delivers at its source the regulated ground potential Vss_reg_i_j applied to the pixel $100_{ij}$. The transistor 111 has another electrode delivering a regulated potential Vdd_reg_i_j to the pixel $100_{ij}$.

The regulated supply potential Vdd_reg is such that at the first order:

$$Vdd\_reg = Vreg\_Vdd - VTN - \text{Delta}\_Vdd\_reg$$

where VTN is the threshold voltage of the transistor 111, and Delta_Vdd_reg a, voltage dependent on the consumption of the electronic circuit(s) of the pixel.

The regulated ground potential Vss_reg is such that at the first order:

$$Vss\_reg = Vreg\_Vss + VTP + \text{Delta}Vss\_reg$$

where VTP is the threshold voltage of the transistor 121, and Delta_Vss_reg a voltage dependent on the consumption of the electronics of the pixel.

Taking an example where: Vss=0 V; Vdd=3.3 V; Vreg_Vdd=2.8 V; Vreg Vss=0.4 V; VTN=0.6 V; VTP=0.6 V.

One obtains (in volts):

Vdd_reg=2.2−Delta Vddreg;

and Vss_reg=1+Delta Vss reg.

The transistors 111 and 121 may be implemented with parameters W and L of channel width and channel length so that their W/L ratio is high, for example at least 10.

Figure 4:
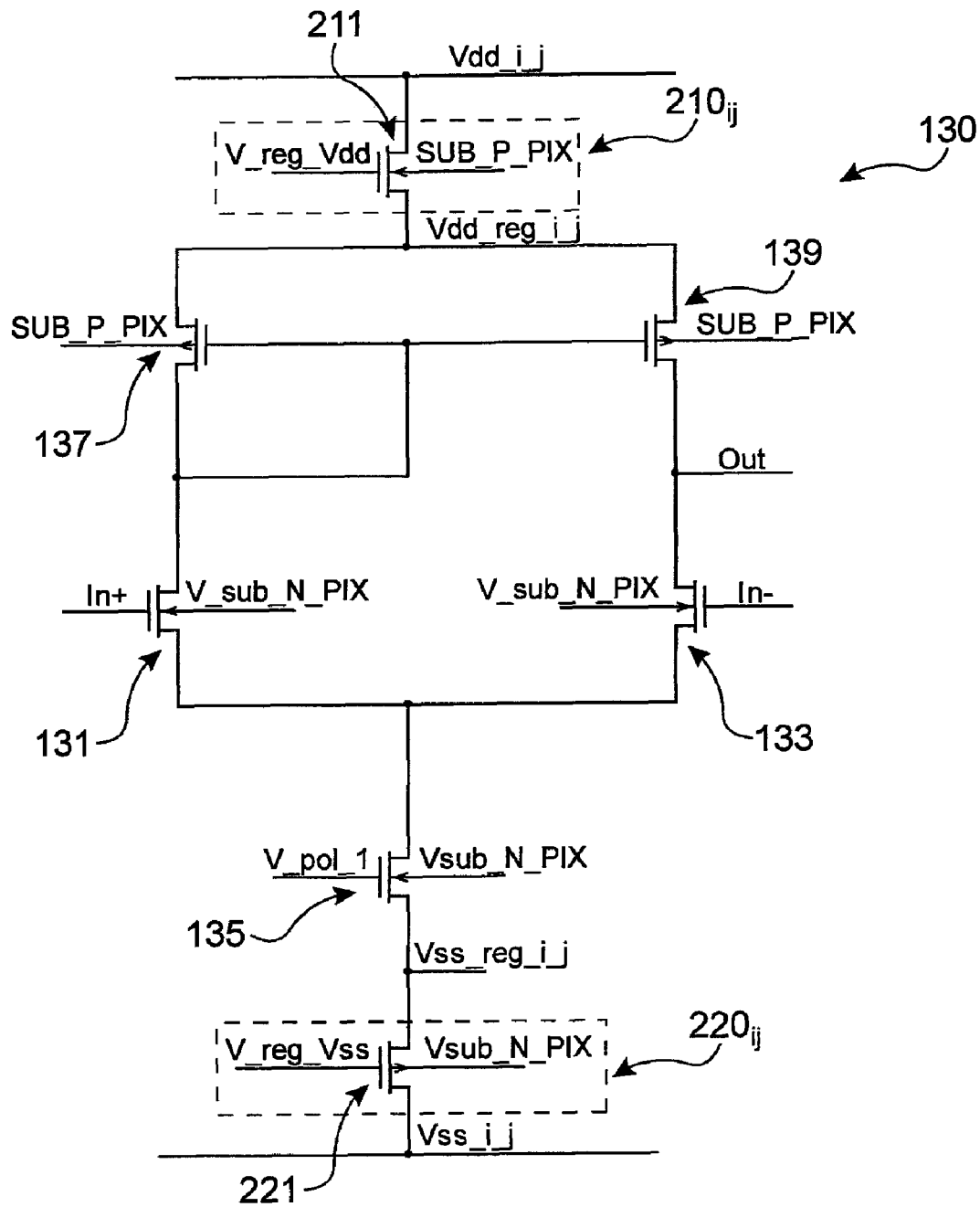
FIG. 4 illustrates an elementary cell of a matrix microelectronic device, associated with a second example of voltage regulation means implemented according to the invention.

Another example of device according to the invention is illustrated in FIG. 4. This device is similar to that given in relation to FIG. 3, but differs by virtue of the first regulating element (in this example noted 210$_{ij}$) and the second regulating element (this time noted 220$_{ij}$).

The first voltage regulating element 210$_{ij}$ is formed of a first regulator transistor 211 that may be of P type and which has a substrate electrode placed at a first substrate potential Vsub_P_pix and connected to the source electrode of the transistor 211. This can make it possible to be free of substrate potential drifts at different points of the matrix, by making the regulated potential independent of the substrate potential. The other type P transistors, for example the transistors 137 and 139 forming the current mirror, may also be equipped with a substrate electrode common to that of the first regulator transistor 211.

The second voltage regulating element 220$_{ij}$ is formed of a regulator transistor 221 that can be of P type and which has a substrate electrode connected to the source electrode and placed at a second substrate potential Vsub_N_pix. The other N type transistors, for example the transistors 131 and 133, forming the differential pair and that of 135 forming the current generator, can also be equipped with a substrate electrode connected to the second substrate potential V_sub_N_pix. This can enable the leakage currents from transistors compared to the substrate to be reduced on large size matrices, as well as the capacitive injections of charges during switchings of the electronic circuits of the pixels.

In this example, the regulated ground potential Vss_reg_ij may serve as substrate potential, for all the substrate electrodes of the N type transistors, in particular transistors 131, 133, 135, 211 except, if appropriate, for the N type transistors of the electronic circuit(s) of the pixel which may require their own source connected to their own substrate.

The regulated supply potential Vdd_reg_ij may serve as substrate potential for all the substrate electrodes of the P type transistors, in particular transistors 137, 139, 221, except if appropriate for the P type transistors of the pixel electronics which may require their own source connected to their own substrate.

For this second embodiment, each pixel forms a power consumption point distinct from the other pixels, functioning between the regulated supply potential Vdd_reg_ij and the regulated ground potential Vss_reg_ij.

With for example polarisation values such that Vss=0V, Vdd=3.3V; Vreg_Vdd=2.8V; Vreg_Vss=0.4 V; VTN=0.6 V; VTP=0.6 V, one obtains: Vdd_reg=2.2 V−Delta_Vdd_reg and Vss_reg=1 V+Delta_Vss_reg.

In this case, the internal voltage variations of the transistors between their source, gate, drain and substrate terminals, are capable of not exceeding 1.2 V.

Indeed, the second regulating element is polarised between 0 and 1+Delta_Vss_reg, with its substrate at 1 volt+Delta_Vss_reg. It is possible to provide the transistors of the device and their respective consumptions so that Delta_Vss_reg does not exceed 0.2 V.

The first regulating element of Vdd_reg is polarised between 2.2−Delta_Vdd_reg and 3.3 V, with its substrate at 2.2−Delta_Vdd_reg, the device may be designed so that Delta_Vss_reg does not exceed 0.1 V. The pixel is polarised between 1 V+Delta_Vss_reg and 2.2 V−Delta Vdd reg, with the substrate electrodes of the transistors 131, 133, 135, 221, of N type at 1 V+Delta_Vss_reg and the electrodes of the transistors 137, 139, 211, of P type at 2.2 V−Delta_Vdd_reg.

A supply voltage carried by the line 101 of the matrix of pixels may thus be used such that Vdd=3.3 V while conserving the transistors normally provided for a supply of 1.2 V, which makes it possible to use transistors of size or having a gate dielectric thickness less than transistors that can be polarised by a supply voltage of 3.3 V. With such a device, it is also possible to accept ohmic drops of several hundreds of millivolts on the lines 102$_1$, 102$_2$, . . . , 102$_m$, connected to the supply line 101, as well as potential variations of several hundreds of millivolts on the lines 104$_1$, 104$_2$, . . . , 104$_m$, connected to the ground line 103, with it leading to a difference of operation between the pixels spread out along these lines.

Figure 5:
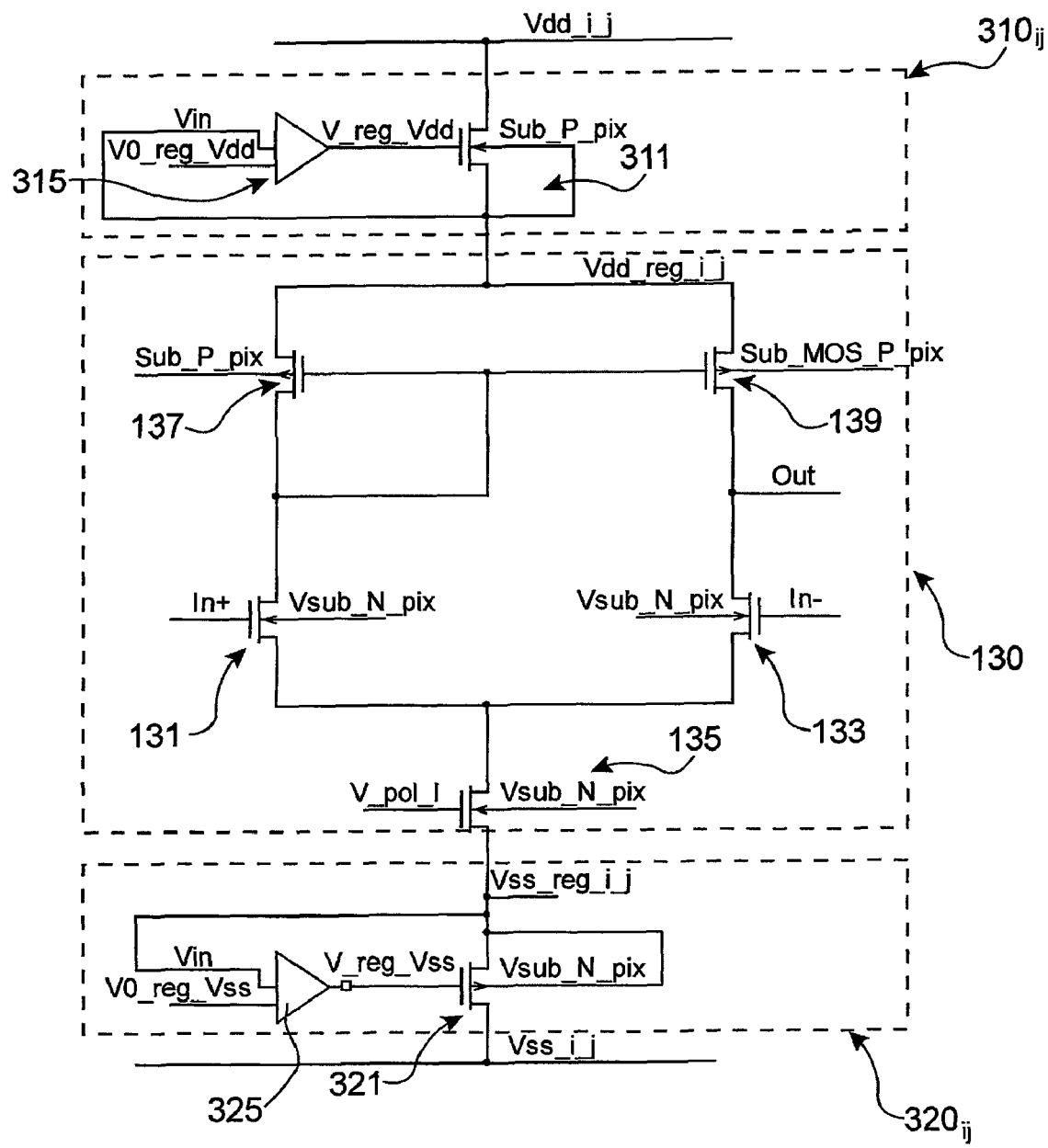
FIG. 5 illustrates an elementary cell of a matrix microelectronic device, associated with a third example of voltage regulation means implemented according to the invention.

Another example of device according to the invention is illustrated in FIG. 5.

This example of device differs from that of FIG. 4, in that the first voltage regulating element (this time noted 310$_{ij}$) is formed of a transistor 311 that may be of P type, and means forming a feedback loop with gain, for example by means of a differential amplifier 315, the output of which is connected to the gate of the transistor 311, and in which the inverting input is connected to the substrate and source electrode of the transistor 311.

The non-inverter input of the differential amplifier 315 is for its part placed at a potential V0_reg_Vdd that serves as reference voltage.

The polarisation potential V0_reg_Vdd may be applied to several regulating elements of the supply potential. The polarisation potential V0_reg_Vdd may be applied, for example by means of a conductive line or a network or a grid of conductive lines (not represented), to several differential amplifiers of the type of the amplifier 315. The output of the differential amplifier 315, which is connected to the gate of the transistor 311, delivers a potential V_reg_Vdd.

According to this third embodiment, the gate command, V_reg_Vdd of the transistor 311 delivering a supply voltage Vdd_reg_ij, is defined by a differential amplifier of gain G, comparing the regulated supply potential Vdd_reg_ij and the reference voltage V0_reg_Vdd. The source potential of the transistor 311 is thereby adjusted, which is also the potential regulated to V0_reg_Vdd. It is thereby possible to be free of drifts of the threshold voltage of the regulation transistor and drifts due to the manufacturing process.

The second voltage regulating element 320$_{ij}$ is formed for its part of a transistor 321 that may be of N type, and means forming a differential amplifier 325, in which the output is connected to the gate of the transistor 311, and in which the inverting input is connected to the source electrode and to the substrate electrode of the transistor 321, whereas the other input of the differential amplifier 325 is placed at a potential V0_reg_Vss, which serves as reference voltage. The output of the differential amplifier 325, which is connected to the gate of the transistor 321, delivers a potential V_reg_Vss.

In the same way, the gate command, V_reg_Vss of the transistor 121 regulating the ground potential Vss_reg_ij, is defined by a differential amplifier of gain G, comparing the regulated ground potential Vss_reg and the reference voltage V0_reg_Vss.

Such an assembly makes it possible to obtain:

$$Vdd\_reg = V0\_reg\_Vdd + 1/G(-VTN - Delta\_Vdd\_reg)$$

Vss_reg=V0_reg_Vss+1/G(VTP+Delta_Vss_reg). The regulated potentials Vdd_reg and Vss_reg are thereby better defined.

In the embodiments described previously in relation to FIGS. 3, 4, and 5, the regulating elements 110$ij$, 120$ij$, 210$ij$, 220$ij$, 310$ij$, 320$ij$, do not consume or consume little current on their respective inputs each connected to a regulation potential V_reg_Vss or V_reg_Vdd. Indeed, in these examples, the regulation potential is applied to a transistor gate (this transistor being noted 111 for the regulating element 110$ij$, 121 for the regulating element 120$ij$, 211 for the regulating element 210$ij$, 221 for the regulating element 220$ij$, 311 for the regulating element 310$ij$, 321 for the regulating element 320$ij$). There is therefore a low or negligible ohmic drop on the network or on the conductive line(s) respectively distributing regulation potentials V_reg_Vss or V_reg_Vdd.

According to an alternative embodiment, the regulation potentials V_reg_Vss and/or V_reg_Vdd may be implemented at the level of each pixel, by means of cells of type normally known as "bandgap", enabling a reference voltage to be imposed. The document: "*A sub-1 volt CMOS Bandgap Voltage Reference based on body driven technique*", Aldokhaiel et al., *Regular Session A, IEEE* 2004.

The invention claimed is:

1. Matrix microelectronic device comprising:
   a plurality of cells arranged according to a matrix,
   one or several conductive lines provided to carry a given potential and to which respectively one or several cells of a row of cells of the matrix are linked,
   a plurality of voltage regulating elements,
   wherein said regulating elements are each connected between a cell of said plurality of cells and one of said conductive lines, wherein each of the plurality of regulating elements is respectively connected to a single associated cell from the plurality of cells, said given potential serving as polarisation potential of said regulating elements, wherein said regulating elements are respectively provided to apply to each of the plurality of cells a regulated polarisation potential.

2. Matrix microelectronic device according to claim 1, in which said conductive lines comprise one or several conductive supply lines provided to carry a supply potential,
   wherein the device comprises among said plurality of voltage regulating elements, one or several supply potential regulating elements, wherein said supply potential regulating elements are connected respectively between a cell of said plurality of cells and one of said conductive supply lines, polarised by means of the supply potential, and respectively provided to apply to said cell a regulated supply potential.

3. Matrix microelectronic device according to claim 1, in which said conductive lines comprise one or several conductive lines provided to be placed at a reference or ground potential, the device comprising among said plurality of voltage regulating elements one or several ground potential regulating elements, wherein said ground potential regulating elements are polarised by means of the ground potential and respectively provided to apply to said cell a regulated ground potential.

4. Matrix microelectronic device according to claim 1, wherein the regulating elements comprise respectively at least one regulation transistor, provided to be arranged and polarised in such a way as to function in saturation regime.

5. Matrix microelectronic device according to claim 4, in which the regulating elements comprise respectively at least one regulation transistor having a gate placed at another polarisation potential, the device further comprising:
   means to apply said other polarisation potential to the gate of a plurality of regulation transistors.

6. Matrix microelectronic device according to claim 4, the regulating elements comprising respectively:
   means forming a differential amplifier in which one input is placed at the regulated polarisation potential, and in which the output is connected to a gate of the regulation transistor.

7. Matrix microelectronic device according to claim 6, in which the differential amplifier, comprises one input placed at another polarisation potential, the device further comprising:
   means to apply said other polarisation potential at the input of a plurality of differential amplifiers.

8. Matrix microelectronic device according to claim 4, in which the transistor comprises a source electrode at the regulated polarisation potential and a substrate electrode connected to said source electrode.

9. Matrix microelectronic device according to claim 1, the cells comprising respectively:
   at least one electromagnetic radiation detector.

10. Matrix microelectronic device according to claim 9, wherein the detector is an X-ray detector.

11. Matrix microelectronic device according to claim 1, wherein each of the plurality of cells is respectively connected to a single associated regulating element from the plurality of regulating elements.

12. Matrix microelectronic device according to claim 1, wherein each of the plurality of cells is respectively connected to two associated regulating elements from the plurality of regulating elements.

* * * * *